United States Patent [19]
Finn, III et al.

[11] 4,429,587
[45] Feb. 7, 1984

[54] ATTITUDE INSENSITIVE LUBRICATION SYSTEMS

[75] Inventors: George A. Finn, III, Dalton, Mass.; James E. Kuneman, Liverpool, N.Y.; Keith E. Lawrence, Lanesborough, Mass.

[73] Assignee: General Electric Company, Schenectady, N.Y.

[21] Appl. No.: 301,101

[22] Filed: Sep. 10, 1981

[51] Int. Cl.³ .................... F16H 57/04; F01M 9/00
[52] U.S. Cl. ........................... 74/467; 184/6.12
[58] Field of Search ............ 74/467; 184/6.12, 6.23

[56] References Cited

U.S. PATENT DOCUMENTS

| | | | |
|---|---|---|---|
| 342,425 | 5/1886 | Byrne et al. | 184/70 |
| 2,432,130 | 12/1947 | Serrell et al. | 184/6.23 |
| 2,754,693 | 7/1956 | Tholl et al. | 74/665 Q |
| 2,888,097 | 5/1959 | Scheffler, Jr. | 184/6.23 |
| 2,943,517 | 12/1958 | Markley et al. | 74/750 R |
| 2,980,209 | 3/1958 | Rabson | 184/11 R |
| 3,065,822 | 11/1962 | McAfee et al. | 184/6.12 |
| 3,146,629 | 9/1964 | Schmitter | 74/467 |
| 3,502,177 | 3/1970 | Christie | 184/11 R |
| 4,221,279 | 9/1980 | Jones et al. | 74/467 |
| 4,222,283 | 9/1980 | Nagy | 74/467 |

FOREIGN PATENT DOCUMENTS

53-132652 11/1978 Japan ..................................... 74/467

OTHER PUBLICATIONS

"Pump Handbook", I. J. Karassik et al., editors, McGraw-Hill, Inc., 1976 (pp. 2-203 and 2-204).

*Primary Examiner*—Lawrence J. Staab
*Assistant Examiner*—Michael D. Bednarek

[57] ABSTRACT

A lubrication system for a gearbox having a forced flow of lubricant around one or more flow loops using dynamic forces imparted to the lubricant by a major element, preferably one primarily serving another function, which acts as a pump and cooperates with the gearbox casing to provide a dynamic reservoir. The primary lubrication flow loop includes an efficient flow diverter to feed a lubricant distribution reservoir, dispensers, predetermined regulated flow paths to critical items and a centrifugal separator built into the pump to deaerate the lubricant.

6 Claims, 3 Drawing Figures

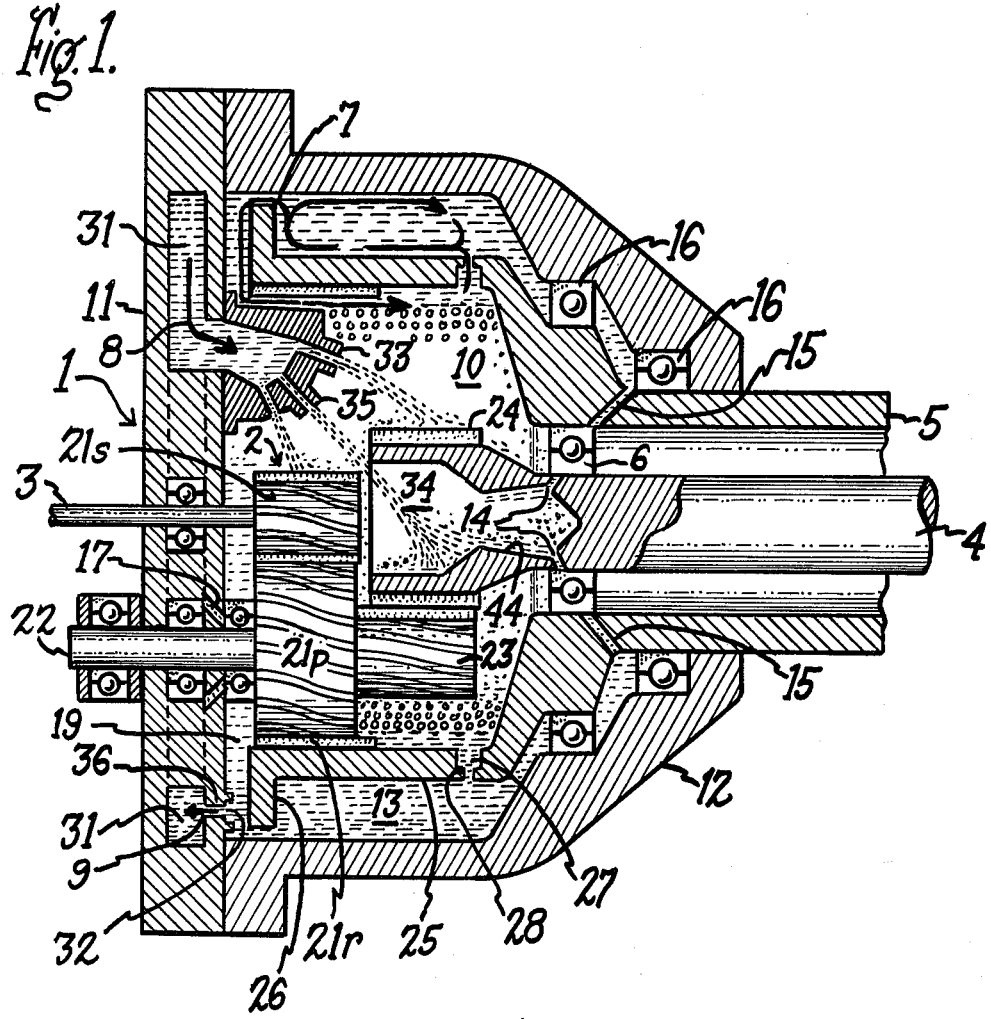
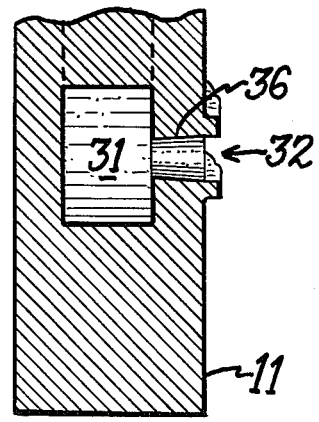
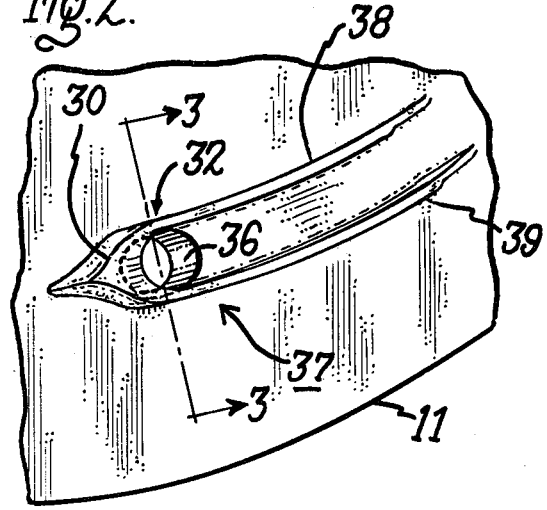

ATTITUDE INSENSITIVE LUBRICATION SYSTEMS

The U.S. Government has rights in this invention pursuant to Contract No. N00024-79-C-6276 awarded by the Department of the Navy.

BACKGROUND OF THE INVENTION

1. Field of the Invention

This invention pertains to a lubrication system for a transmission or gearbox irrespective of the orientation of the gearbox with respect to gravitational forces and particularly for systems which require high quality lubrication with a limited quantity of lubricant. An eminent example of application of this system is a speed reduction and counter-rotating drive for a torpedo, an application that requires a high quality lubrication of high speed reduction gearing using a minimum of lubricant in a system in which there is no "right side up."

2. Background Art

Gearbox lubrication systems can generally be classified in three groups: those in which lubrication depends on the splash and momentum of lubricants in which parts or all of components of the gear train run immersed in the lubricant; those in which a splash system is enhanced, supplemented or partially replaced by components included for the purpose of lubricant distribution; and those in which an auxiliary or external pump or other device is used to supply lubricant from a separate source under pressure. This invention pertains to the second of those three categories, i.e., that in which lubrication is enhanced by the inherent design of, or use of modified or additional components in, the gear train itself. An early form of lubrication enhancement is represented by Byrne, U.S. Pat. No. 342,425, wherein a rotating member which runs partially submerged in an oil sump has added to it an open-ended pipe or scoop which picks up oil from the sump at each revolution and then permits that oil to gravitate over working parts during another portion of the revolution. Other systems, too numerous to mention, having scoop pickups include Christie, U.S. Pat. No. 3,502,177, which combines an oil scoop pickup on a rotating member with a spinning member which receives the lubricant from the scoop and forces it through a filter element by means of centrifugal force. A modification of this concept is represented by Tholl et al., U.S. Pat. No. 2,754,693, wherein a pitot tube is used in combination with a lubricant flow induced by movement of other parts so that a portion of the flow is diverted by the pitot tube and carried to a position where it is released for gravitational flow over moving parts. A still further refinement is represented by McAfee et al., U.S. Pat. No. 3,065,822, wherein a pitot tube inserted in a rotating supply of lubricant created by centrifugal force imparted by a spinning gear is used to guide oil through passageways to be distributed under the force of the flowing lubricant rather than by means of gravity to portions of a gear train. However, McAfee's gear 33 appears to have been added solely as a lubrication pump and serves no other purpose. A variation of McAffee's system is shown in Rabson, U.S. Pat. No. 2,980,209, where a deflector is used in combination with a hole in a surface as an oil flow pickup to feed oil to a tube for movement to an element to be lubricated. As an added feature, Rabson includes holes in the spinning member which induces the flow of lubricant to enhance and direct oil flow, but, like McAfee, Rabson uses gravity for return of the lubricant to an operating sump. Pitot tubes or rotating casing pumps are also treated in the "Pump Handbook," I. J. Karassik (and others), McGraw-Hill, Inc., 1976, wherein pages 2-203 and 2-204 include a characterization of one model, citing a small capacity and medium to low efficiencies.

SUMMARY OF THE INVENTION

This invention provides a complete, integrated high performance lubrication system for a transmission or a gearbox in which multiple circulation loops of flow of the lubricant results from flow and pressure derived from dynamic forces generated by the spinning of components of the gear train and includes a centrifugal separator for deaeration, lubricant spray to critical portions of the gear train, and circulation of lubricant through a series of conduits to lubricate bearings. The system is independent of gravity, provides for a maximization of lubricant flow and enhances thermal management by limiting lubricant quantity to permit a quick warm-up and by providing for lubricant flow over casing surfaces. The invention contemplates using a ring gear or other revolving gear element as a centrifugal pump to cause a basic lubricant flow pattern in combination with reservoirs, pressure distribution system, a directed flow inlet interdicting the principal lubricant flow within the gearbox to feed and pressurize the reservoir, a spray outlet from a reservoir, bearing lubrication ducts, a recirculation path to provide lubricant to part of the gear train, and a centrifugal separator built into the gear element constituting the centrifugal pump. The invention is particularly applicable to gearboxes which are intended for use independent of gravitational forces.

BRIEF DESCRIPTION OF THE DRAWINGS

FIG. 1 is a cross section of a transmission or a gearbox incorporating the novel lubrication system of the invention.

FIG. 2 is a perspective view of a portion of the structure illustrating an efficient flow diverter having a particular applicability in the system of FIG. 1.

FIG. 3 is a cross section of the flow diverter of FIG. 2 taken along the line 3—3 of FIG. 2.

DETAILED DESCRIPTION

The lubrication system forming the subject matter of this invention is illustrated and described as implemented in the reduction drive gearbox or transmission for a counter-rotating propeller torpedo as shown in FIG. 1. The structure illustrated includes a gearbox indicated generally as 1 and a gear train 2 in the interior cavity 10 which provides for reducing an input taken from input shaft 3 to lower speed counter-rotating shafts 4 and 5 of which, in the application described, each drives one of two counter-rotating propellers. The gear train 2 in this instance is a planetary set 21 consisting of a sun gear 21s driven by input shaft 3, one or more planetary pinions 21p and a ring gear 21r wherein the planetary gears 21p are compound having both 21p and 23 pinions which are mounted on a stub shaft 22 journaled in the base plate 11 of the housing which acts as the planetary carrier for the epicyclic set. The pinion 23 portion of each compound planetary which is fixed to each planetary 21p for rotation therewith is meshed with an additional sun gear 24 which drives the central output shaft 4. Planetary set 21 can include any number of planetary gears 21p of which only one is shown here to simplify illustration of the device. Ring gear 21r constitutes a portion of an enlarged hollow bell-shaped drum portion extension 25 of hollow shaft 5 which is attached to and drives one of the counter-rotating propellers. The relative sizes and ratios of the planetary set 21, the second portion 23 of the compound planetary gears and the additional sun 24 are selected so as to drive shafts 4 and 5 at the appropriate nearly identical speeds in opposite directions from a high speed input which, in this example, would be a turbine or electric motor attached to input shaft 3. The bell drum 25 is also provided with a terminal flange portion 26 and a plurality of holes 27 which constitutes a part of the lubrication and circulation systems and will be more fully explained.

The counter-rotating shafts 4 and 5 are supported by central bearing 6 and bearings 16 in a housing 12 which is shaped so as to provide a cylindro-annular space 13 between housing 12 and bell drum 25. The space 13 is a part of the lubrication and cooling system, communicates with conduits 15 running through shaft 5 or a web structure interconnecting the shaft and drum and constitutes a collection reservoir for lubricant. Secondary sun gear 24 also consitutes a hollow enlargement on central output shaft 4 and is provided with conduits 14 which communicate between the interior 34 of gear 24 and the bearing so that conduits 14 and 15 provide a flow path to move a lubricant via elements requiring lubrication to the collection reservoir 13 under centrifugal forces resulting from the normal operation of the gear train.

The terminal flange portion 26 of bell drum 25 subdivides an annular portion of the space at 19 between housing 12 and bell drum 25 from the cylindro-annular collection reservoir 13 to constitute dynamic fluid annulus 19 fed by lubricant flowing over ring gear 21r and flowing between flange 26 and housing 12 from collection reservoir 13.

The base plate or input end wall 11 of gearbox 1 includes an interior annular pressurized distribution reservoir 31 which is an integral part of the lubrication system and communicates with a dynamic fluid annulus 19 through pickups or diverters 32 and dispensers 33 for providing a forced flow of lubricant to critical operating components. Because the end wall 11 acts as the carrier for the planetary set 21, the dispensers 33 can intrude into the interior cavity 10 between planetary gears and any number of dispensers 33 can be used although, depending on the other parameters involved, a single dispenser with multiple nozzle or spray outlets may be sufficient. The number of pickups 32 used in any system will also depend on the other parameters and particularly the lubricant momentum available in the dynamic annulus 19, the amount of pump flow required to force lubricant gear meshes and bearings using dispensers 33, the passage area and geometry of each pickup, and the viscosity of the lubricant used. In the exemplary embodiment illustrated and described, the diverters 32 are located radially more remote from the center of the device than the dispensers 33 permitting a design of the shape of the annular reservoir 31 such that the input flow will be close to the outer circumference of the annular reservoir with the dispensers 33 being fed from extensions extending radially inwardly of the structure. However, this shape is not critical, particularly since the system contemplates only a low or moderate flow rate within the distribution reservoir. Dispensers 33 can be provided with any required number and orientation of nozzles 35 to direct the flow of lubricant onto critical components as, for example, pinions including sun gears 21s and 24 as illustrated and into the hollowed-out portion 34 of the enlargement on shaft 4 which forms the additional sun gear 24.

Since the lubrication system is based on the use of fluid momentum and centrifugal force, both to provide forced lubrication and to remain independent of gravitational forces, the primary component is the bell drum 25 which in addition to carrying a ring gear 21r and interconnecting the ring gear to output shaft 5 imparts lubricant with a momentum which forces the lubricant through holes 36 of diverters 32 into the annular reservoir 31 where its kinetic energy is converted to a static pressure. The open end of bell drum 25 as illustrated includes a flange 26 extending radially outwardly from the open rim of the drum, presenting a ring or annular surface toward end wall 11 to define the critical portion of dynamic annulus 19. The annular surface, of the flange 26 or merely of the rim of 25 itself, constitutes a pump that imparts a velocity and a momentum to the lubricant by its rotation and may be referred to as a ring pump. The ring pump is most effective for this purpose when it and the diverters 32 are located so as to maximize their cooperation. Bell drum 25 includes holes 27 which may or may not have a reduced portion 28 to control secondary cooling circulation through the holes 27 as lubricant, which is barred by the ring gear structure 21 from flowing through the mouth of the bell, escapes the interior of the bell drum under the influence of the centrifugal forces to flow into the collection reservoir or space 13 against housing 12. As lubricant flow is restricted by holes 27, the lubricant will force any foam or other entrained air back toward the center of the interior of drum 25 to cause drum 25 to act as a centrifugal separator so as to deaerate lubricant passing through holes 27 and maintain the pressure of lubricant in the annular space or collection reservoir 13 above atmospheric pressure. As noted, reduced diameter portions 28 or other element variations can be used to assist in providing the proper cooling circulation and lubricant pumping characteristics which will depend on, among other things, stagnation and centrifugal pressure available from the dynamic annulus 19, the viscosity and specific gravity of the lubricant, and the geometry of annular distribution reservoir.

Primary lubricant circulation starts with the flow of the centrifuged lubricant in the dynamic annulus 19 between the face of flange 26 and along the interior surface of the end plate 11 where a quantity of the flow is diverted through pickups 32 as indicated by arrow 9 pressurizing and feeding the annular reservoir 31, and flowing around the periphery of that reservoir until it escapes as indicated by arrow 8 through nozzles 35 of the dispenser 33 onto the sun gears or into the hollowed interior of sun gear 24. The portion of the flow striking the sun gears lubricates the meshing of the sun gears with the planetary gears and continues to the interior of the drum 25 to be centrifuged back through holes 27 to the collection reservoir or centrifugal sump 13. At least a part of the lubricant entering the cavity 34 is retained in the inner sump portion of that cavity by the shape of the wall 44. Centrifugal force applied by the rotation of shaft 4 will force that lubricant through conduits 14 to lubricate bearing 6 and escape therefrom through conduits 15 to provide lubrication to bearings 16 as it flows back into and is pressurized into the centrifugal sump 13.

The secondary cooling circulation loop as indicated by arrow 7 consists of flow starting at holes 27 through reduced portions 28, through the centrifugal sump 13, through dynamic annulus 19, around ring gear 21r to holes 27 starting the circuit over. The side of flange 26 also induces circulation within the centrifugal sump 13 causing a flow against housing 12 which serves as a heat sink to cool the oil. Secondary cooling circulation is caused by a pressure differential across the inside and outside surfaces of drum 25. Circulation can be aided if helical gears are used to recirculate around that portion of bell drum 25 constituting the ring gear. Test results have shown that secondary cooling circulation reduces pressure transients in the gearbox when rotation starts. It also increases the efficiency of the ring pump primary lubrication circulation.

Experimentation undertaken to confirm and optimize ring pump and diverter geometry and performance which measured pressures and flows of an appropriate fluid in a "breadboard" device including a bell drum, an end plate with two diverters and piping to represent the flow loop revealed several things. Efficiency is influenced by diverter geometry, relative spacing of diverters and ring pump and surprisingly the cooperation among existence, size and location of holes 27. The holes 27 induced a flow arond the rim portion of drum 25 which enhanced the primary circulation path by feeding the flow as well as creating the secondary cooling flow which also establishes a stabilizing steady state pressure distribution. However, it was apparent that efficiencies substantially higher (i.e., 50-75% range) than those mentioned in the "Pump Handbook" as produced by a pitot tube pump can be attained through use of the improvements described here.

From this description, it is obvious that the lubricant system can be applied to any transmission, transfer case, or other gearbox in which a rotating drum can be located proximate the casing to provide the momentum and centrifugal forces to the lubricant to create a dynamic annulus such as the one included in the system described at 19 between flange 26 and wall 11 or other equivalent peripheral lubricant flow. Such system, of course, is most efficient and cost effective if, as in the case of the system described, an operating component such as ring gear 21r, by itself or in connection with another element of the device, can serve as, or be made into, a component to serve as a ring pump without the addition of separate structures for this purpose. It is obvious, of course, that this lubrication system is inherently applicable to a gear case for creating counter-rotating drives from a single input and other systems using large ring gears.

The efficacy of the invention and the system described can be enhanced or degraded by the selection or design of the particular lubricant pickups used to divert the flow of lubricant into the distribution system. The pickups or flow diverters 32 used here are particularly beneficial in this respect and by experimentation have been found to be much more efficient than bent pipes or other commonly used forms of "pitot tube" pickups. A flow diverter 32, as shown in more detail in FIGS. 2 and 3, constitutes an inclined hole 36 communicating from the dynamic annulus 19 to annular reservoir 31 at an angle that is designed to divert the flow of lubricant with as little resistance as possible under the circumstances and dam structure 37 for channeling lubricant flow along the inside surface of plate 11 into and through hole 36. The same structure includes the side wall portions 38 which may or may not be tapered or stepped as shown at 39 and a dam and flow control portion 30 which will prevent a part of the lubricant flow within the side walls 38 from passing over hole 36. Dam portion 30 is also shaped to facilitate smooth flow of lubricant around the diverter to reduce turbulence as it passes by the dam structure. Dam portion 30 aids in converting lubricant momentum to a pumping pressure head by helping to stagnate lubricant velocity in the annular reservoir 31.

Although the exact detailed configuration of a lubrication system according to this invention may necessarily differ from implementation to implementation and include features already being used in other systems, a substantial improvement in lubrication of gear trains can be obtained by the combination of elements as described and claimed.

We claim:

1. In a gearbox, an improved lubrication system comprising: a centrifugal pump component composed of the combination of:
   (a) a rotating drumlike element of the included gear train surrounding other active gear train elements and receiving lubricant centrifugally discharged by rotation of those other elements,
   (b) the portion of the gearbox casing surrounding said rotating portion and
   (c) the annular space defined between said drumlike element and said portion constituting a lubricant collection reservoir and a dynamic annulus within said casing partially separated from each other by a portion of said drumlike element which also imparts a circular flow of lubricant in said dynamic annulus, said drumlike element also having a plurality of fluid flow passages there through to cause said drumlike portion to act as a centrifugal separator to deaerate a contained lubricant and to fill and pressurize said collection reservoir with deaerated lubricant when said gear train is operating to cause said dynamic annulus to be charged with lubricant under pressure;
   an additional pressurized reservoir separated from said dynamic annulus by portions of said casing;
   at least one flow diverter in said casing for shunting flow of a contained fluid lubricant from said dynamic annulus to said additional pressurized reservoir as flow of said lubricant in said annulus is caused by rotation of said gear train elements;
   one or more fluid dispensers inside said casing having at least one fluid spray outlet fed from said additional pressurized reservoir, said outlets metering and directing flow of said lubricant to elements of said gear train; and
   flow paths in said gear train for continued flow of fluid dispensed from said outlets to critical elements in response to rotational forces;
   whereby said dynamic pump and other rotating elements set up fluid flow patterns which overcome gravitational forces to provide flow patterns irrespective of attitude.

2. The improved lubrication system of claim 1 wherein:
   said flow diverter comprises canalization wall means generally parallel to the direction of flow of said lubricant for channeling said lubricant in said dynamic annulus, a flow dam and a sloped conduit through a casing element to direct fluid lubricant flow from said dynamic annulus to said additional pressurized reservoir.

3. A self-lubricating universal attitude gearbox comprising:
- a gear train including a ring gear;
- a drum axially extending said ring gear and surrounding other gear train components, said drum having an open end terminating in a rim and a web end for connecting said ring gear to another element and having conduits through said drum for lubricant to escape as a result of centrifugal acceleration imparted by the rotation of the ring gear;
- a casing having two end portions connected by a cylindrical portion surrounding said drum to form an annular sump between it and said drum, one said end portion being proximate and parallel to the rim of the open end of said drum, said one end portion containing a reservoir and defining with the rim of said open end of said drum a dynamic annulus for lubricant flowing under the influence of rotating gear train components;
- flow diverter means on said one end portion for diverting lubricant flowing in said dynamic annulus into said reservoir to fill and pressurize said reservoir; and
- lubricant dispensing means also on said one end portion for metering and spraying lubricant from said reservoir onto said other gear train elements within said drum;
- whereby movement of said gear train causes said drum to rotate and act as a dynamic pump and also to cause lubricant within said casing to flow in said dynamic annulus circumferentially of said cylindrical portion of said casing, through said flow diverter means, said pressurized reservoir and said lubricant dispensing means and over said other gear train elements with sufficient momentum to overcome gravitational forces.

4. The self-lubricating universal attitude gearbox of claim 3 wherein:
- said conduits through said drum are restricted to limit flow of lubricant sufficiently to cause the drum to act as a centrifugal separator to deaerate lubricant as it is centrifuged back to said annular sump; and
- said flow diverter means comprises at least one diverter each having a sloped exit port through said one end portion of said casing, a dam downstream of the entrance to said exit port with respect to lubricant flow and channeling means extending upstream from said dam on either side of said entrance;
- whereby flow in said dynamic annulus is both stagnated and diverted by said diverters to fill and pressurize said reservoir.

5. The gearbox of claim 4 wherein:
- one or more of said gear train components contain, or define with said casing, additional paths for flow of lubricant to critical elements as lubricant moves in response to centrifugal forces.

6. The gearbox of claim 4 wherein:
- said gear train includes a planetary set, an input shaft through said one end portion of said casing driving the sun gear of the set, said one end portion constitutes the carrier of said set, an additional planetary pinion fixed to each planetary of said set, an additional sun gear meshed with said additional planet pinions for driving a first output shaft, said additional sun gear being formed on an enlarged open-ended end of said first output shaft, a hollow second output shaft coaxial with said first output shaft attached to said web end of said drum, and bearings supporting said first output shaft within said second output shaft and supporting said second output shaft and said web portion in the end portion of said casing opposite from said one end portion; and
- said additional paths for flow of lubricant including passages through said first output shaft from said open end to a bearing between output shafts and passages through said second output shaft and between said web portion and said casing to permit lubricant to flow through said bearings.

* * * * *